United States Patent
Wallace et al.

(10) Patent No.: US 6,914,526 B2
(45) Date of Patent: Jul. 5, 2005

(54) INTRUSION DETECTION SYSTEM USING LINEAR IMAGING

(75) Inventors: Jon K. Wallace, Redford, MI (US); Stephen R. W. Cooper, Fowlerville, MI (US); Nicholas M. Zayan, Fenton, MI (US); Farid Khairallah, Farmington Hills, MI (US)

(73) Assignee: TRW Inc., Lyndhurst, OH (US)

( * ) Notice: Subject to any disclaimer, the term of this patent is extended or adjusted under 35 U.S.C. 154(b) by 93 days.

(21) Appl. No.: 10/104,173

(22) Filed: Mar. 22, 2002

(65) Prior Publication Data

US 2003/0179083 A1 Sep. 25, 2003

(51) Int. Cl.⁷ .............................................. G08B 13/00
(52) U.S. Cl. .................... 340/541; 340/540; 340/545.3; 359/376
(58) Field of Search ................................ 340/541, 540, 340/545.3, 555, 556, 557; 382/130; 359/376, 462, 475, 471

(56) References Cited

U.S. PATENT DOCUMENTS

| | | | | |
|---|---|---|---|---|
| 3,932,703 A | | 1/1976 | Bolsey ........................ 178/6.8 |
| 4,509,077 A | * | 4/1985 | Therrien ..................... 348/187 |
| 5,027,104 A | * | 6/1991 | Reid ........................... 340/541 |
| 5,091,780 A | * | 2/1992 | Pomerleau .................. 348/152 |
| 5,330,226 A | | 7/1994 | Gentry et al. ............... 280/735 |
| 5,398,057 A | * | 3/1995 | Tapp ........................... 348/154 |
| 5,430,431 A | | 7/1995 | Nelson ........................ 340/434 |
| 5,438,318 A | | 8/1995 | Latorre et al. .............. 340/554 |
| 5,528,698 A | * | 6/1996 | Kamei et al. ............... 382/100 |
| 5,739,912 A | * | 4/1998 | Ishii ............................ 356/602 |
| 5,937,092 A | * | 8/1999 | Wootton et al. ............ 382/192 |
| 5,956,424 A | * | 9/1999 | Wootton et al. ............ 382/192 |
| 6,144,366 A | | 11/2000 | Numazaki et al. .......... 345/156 |
| 6,215,519 B1 | * | 4/2001 | Nayar et al. ................. 348/159 |
| 6,393,133 B1 | * | 5/2002 | Breed et al. ................. 382/100 |
| 6,433,683 B1 | * | 8/2002 | Robinson .................... 340/540 |
| 6,525,653 B1 | * | 2/2003 | Rigmaiden ............... 340/426.1 |
| 6,724,920 B1 | * | 4/2004 | Berenz et al. .............. 382/118 |

* cited by examiner

Primary Examiner—Phung Nguyen
(74) Attorney, Agent, or Firm—Tarolli, Sundheim, Covell & Tummino L.L.P.

(57) ABSTRACT

A vehicle intrusion detection system (10) for detecting an intrusion condition of a vehicle (12) having an occupant compartment (14) partially defined by an outer structure (30) of the vehicle, comprises an actuatable illuminator (40) mounted in the vehicle and having a limited field of illumination (52) extending within the vehicle occupant compartment adjacent the vehicle outer structure. A linear imager (60) mounted in the vehicle (12) has a field of view (62) that substantially coincides with the field of illumination (52) of the illuminator (40). A controller (70) compares a first image taken by the imager (60) when the illuminator (40) is actuated and a second image taken by the imager when the illuminator is unactuated to help determine the existence of an intrusion condition of the vehicle.

24 Claims, 6 Drawing Sheets

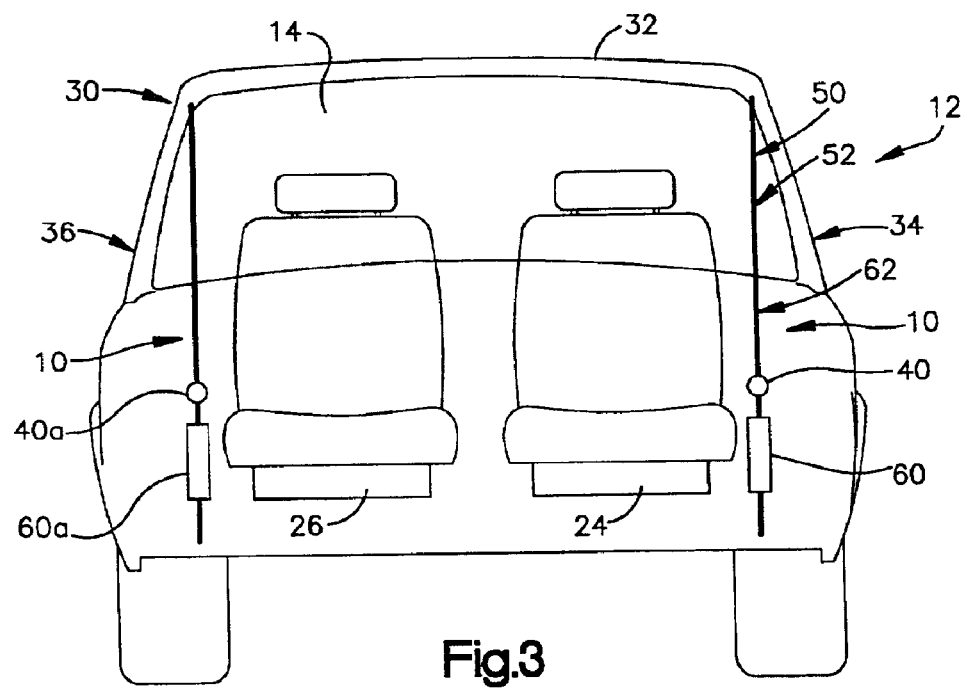
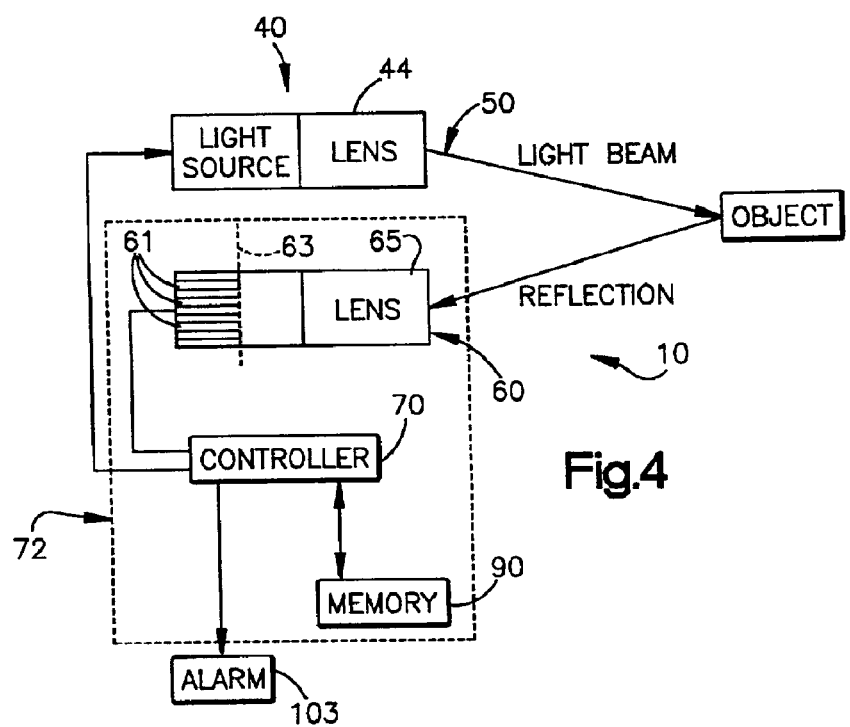

(12) United States Patent
US 6,914,526 B2

INTRUSION DETECTION SYSTEM USING LINEAR IMAGING

BACKGROUND OF THE INVENTION

1. Technical Field

The present invention relates to an intrusion detection system. In the particular, the present invention relates to a vehicle intrusion detection system that employs a linear imager to image a limited portion of the vehicle interior.

2. Description of the Prior Art

It is known to provide an intrusion detection system for a vehicle, such as an automobile. One type of known system includes a camera that is operative to take pictures (images) of the interior of the vehicle, in order to detect an intrusion into the vehicle. Another type of system uses ultrasonic sensing.

An intrusion detection system should have low power consumption, so that the vehicle battery is not drained when the alarm system is operated for a long period of time without the vehicle engine running. A typical visual light based system illuminates the entire vehicle interior, thereby drawing a large amount of power. In addition, false alarms should be minimized. For example, an ultrasonic system may give a false alarm if the vehicle window is at least partially open and an object comes near to, but does not enter, the vehicle occupant compartment. A visual light based system can be susceptible to variations in ambient lighting, particularly to moving shadows cast by objects outside of the vehicle and provide a false alarm.

SUMMARY OF THE INVENTION

In accordance with one embodiment of the present invention, a method is provided for detecting an intrusion condition of a vehicle having an occupant compartment partially defined by an outer structure of the vehicle. The method comprises the steps of actuating an illuminator having a limited field of illumination extending within the vehicle occupant compartment adjacent an outer structure of the vehicle, and actuating an imager that has a field of view that substantially coincides with the field of illumination of the illuminator. The method further comprises the steps of creating a first image of objects in the field of illumination when the illuminator is actuated, creating a second image of objects in the field of illumination when the illuminator is not actuated, subtracting the first image from the second image to establish a sample image, and determining the existence of an intrusion condition of the vehicle on the basis of a comparison of at least two sample images.

In accordance with another embodiment of the present invention, a method is provided for detecting an intrusion condition of a vehicle having an occupant compartment. The method comprises the steps of illuminating a predetermined field of illumination in the vehicle interior that is less than 5% of the vehicle interior, for a first predetermined period of time of less than ten milliseconds and creating a first image of objects in the field of illumination during the first period of time. When the illuminator is not actuated, a second image of objects in the field of illumination is created during a second predetermined period of time of less than ten milliseconds. The method further comprises the steps of comparing the first image with the second image, and determining the existence of an intrusion condition of the vehicle on the basis of the image comparison.

In accordance with another embodiment of the present invention, a vehicle intrusion detection system is provided for detecting an intrusion condition of a vehicle having an occupant compartment partially defined by an outer structure of the vehicle. The system comprises an actuatable illuminator mounted in the vehicle and having a limited field of illumination extending within the vehicle occupant compartment along the vehicle outer structure. A linear imager is mounted in the vehicle and has a field of view that coincides with the field of illumination of the illuminator. The system includes means for comparing a first image taken by the imager when the illuminator is actuated and a second image taken by the imager when the illuminator is unactuated to determine the existence of an intrusion condition of the vehicle.

BRIEF DESCRIPTION OF THE DRAWINGS

The foregoing and other features of the present invention will become apparent to one skilled in the art to which the present invention relates upon consideration of the following description of the invention with reference to the accompanying drawings, in which:

FIG. 3 is a front elevational view taken along line 3—3 of FIG. 2;

FIG. 4 is a functional block diagram of the intrusion detection system of FIG. 1;

DESCRIPTION OF THE INVENTION

The present invention relates to an intrusion detection system. In the exemplary embodiments described and shown, a linear imager is used to image a limited portion of the vehicle interior. FIGS. 1–4 illustrate schematically an intrusion detection system 10 in accordance with a first embodiment of the invention. The system 10 is shown mounted in a vehicle 12.

Figure 1:
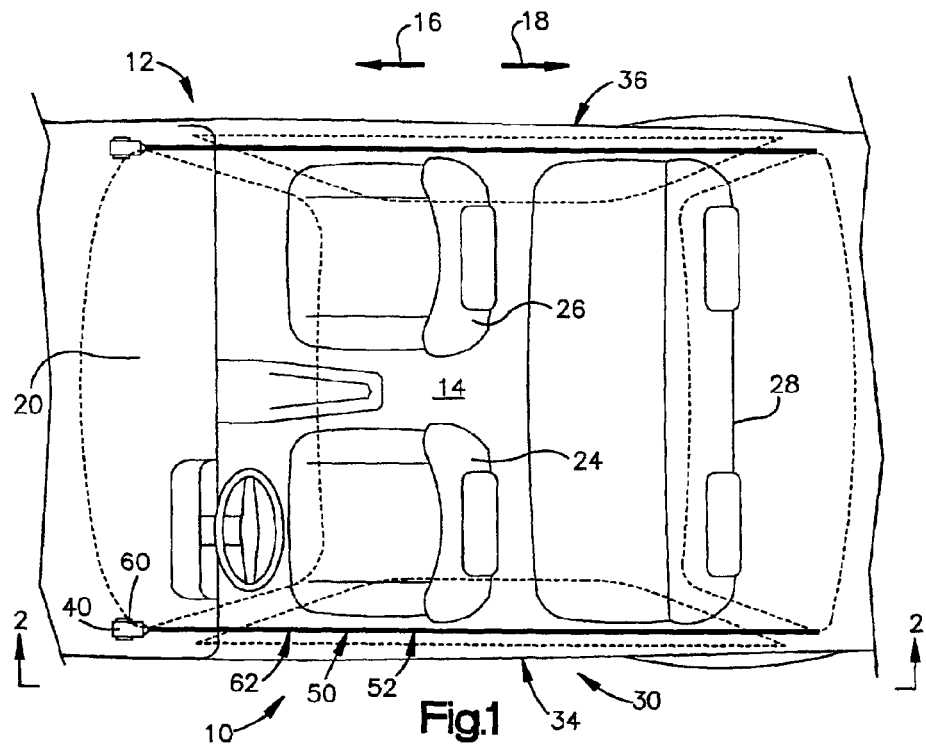
FIG. 1 is a top plan view of a portion of a vehicle including the vehicle occupant compartment, showing an intrusion detection system in accordance with one embodiment of the invention.
Figure 2:
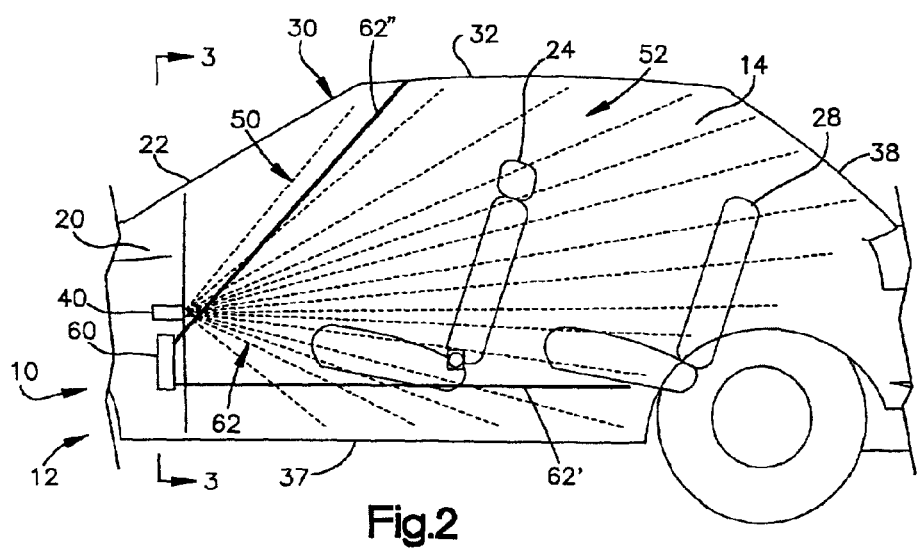
FIG. 2 is a side elevational view taken along line 2—2 of FIG. 1.

Referring to FIGS. 1–3, the vehicle 12 includes a vehicle occupant compartment 14. A forward direction in the vehicle 12 is indicated by the arrow 16 and a rearward direction in the vehicle is indicated by the arrow 18.

The vehicle 12 includes a dashboard 20 and a windshield 22, located at the forward end of the occupant compartment 14. A driver's seat 24 and a front passenger seat 26 are located rearward of the dashboard 20. The vehicle back seat 28 is located rearward of the front seats 24 and 26.

The vehicle 12 includes an outer structure 30 that defines and encloses the occupant compartment 14. The outer structure 30 includes a roof panel 32 that defines the top of the occupant compartment 14, and a left side structure 34 and a right side structure 36 that define the left and right sides, respectively, of the occupant compartment. The outer structure 30 also includes the vehicle windshield 22 and dashboard 20 that define the front of the occupant compartment 14; a floor pan 37 that defines the bottom of the occupant compartment; and a vehicle rear window 38 that defines the back of the occupant compartment.

Referring to FIGS. 1–4, the intrusion detection system 10 includes an illuminator 40. The illuminator 40 is preferably an LED (light emitting diode) or a laser diode. The light produced by the illuminator 40 is preferably in the near infrared range (just above visible light), but could alternatively be light in another portion of the spectrum, for example, visible light.

The illuminator 40 is mounted in a location in the vehicle 12 so that its light output extends along the inside of, or adjacent, a portion of the vehicle outer structure 30. In the embodiment illustrated in FIG. 1, the illuminator 40 is located on a forward portion of the vehicle 12, for example the dashboard 20, on or near or below the vehicle A-pillar (not shown).

The illuminator 40 includes a lens 44 to focus its light output into a horizontally narrow beam 50 (as viewed from the top as in FIG. 1) that diverges by only about one to three degrees in a horizontal direction, and preferably no more than about five degrees. The light beam diverges up to about 90 degrees or more in a vertical direction. As a result, the light beam 50 produced by the illuminator 40 is a narrow curtain of light that extends along, or adjacent, the inside of the vehicle left side structure 34, without actually impinging on the side structure such as the vehicle side windows. As a result, the field of illumination 52 of the illuminator 40, which is co-extensive with the light beam 50, includes those areas through which a vehicle intrusion would take place were it to come from the left side structure 34, e.g., through a window or door on the driver's side of the vehicle 12.

The horizontal spread (across the width of the vehicle as viewed in FIG. 1) of the field of illumination 52 of the illuminator 40 is "limited"; that is, occupies a very small percentage of the vehicle occupant compartment 14, in the range of from under 1% to about 5%. In addition, the field of illumination 52 is much smaller than the field of illumination of a typical vehicle intrusion detection system that operates on visible light. As an example, a beam of light 50, having a point of origin and a horizontal spread of about five degrees, has a horizontal spread of zero inches at the origin and a horizontal spread of about six inches at a distance of six feet from the origin. Thus, the average spread of such a light beam 50 would be about three inches over the six foot length of the vehicle occupant compartment 14. If the occupant compartment 14 were six feet wide, then the field of illumination 52 of such a beam of light 50 on average would occupy only one twenty-fourth, or about 4% of the vehicle occupant compartment 14. A beam of light 50 having a horizontal spread of only one degree would occupy less than 1% of the vehicle occupant compartment 14. Illuminating such a relatively small area with a light beam having an intensity sufficient to detect intrusions, could take less power than illuminating the entire interior of the vehicle. This could help avoid draining the vehicle's battery if the intrusion detection system 10 were left on for a long period of time.

The illuminator 40 is operative to provide short, rapid pulses of light. For example, the illuminator 40 can be an LED, which is controlled to provide light pulses having a duration of 10–20 microseconds. Alternatively, the illuminator 40 can be a laser diode controlled to provide light pulses having a duration of 200 nanoseconds.

An imager 60 is provided and is preferably an electro-optic imager such as a charge-coupled device ("CCD"). A CCD is a semiconductor device having a plurality of imaging sites, or pixels, that collect electrons generated by photon absorption in their vicinity. The CCD output provides an indication of the light intensity present at each pixel.

The imager 60 is preferably a linear imager, having a plurality of pixels 61 that lie in a line along a focal plane 63. The imager 60 includes a lens 65 that focuses light so that the portion of the light that is desired to be captured falls on the line of pixels 61 of the imager 60 to form the image.

The imager 60 is mounted and oriented in the vehicle 12 so that its field of view 62, that is, the area imaged by the pixels 61 between lines 62' and 62", substantially coincide with the field of illumination 52 of the illuminator 50. That is, the area imaged by the pixels 61 between lines 62' and 62" is as close to being the same area as, the field of illumination 52 of the imager 50, without extending outside of the field of illumination of the imager. The pixels 61 of the imager 60 thus produce an electronic, or image, output that represents a measure of the light intensity that is reflected from the objects illuminated by the illuminator 40. The imager 60 is controlled to take images for short periods of time (exposures), coinciding with the short periods of illumination provided by the illuminator.

In the embodiment illustrated in FIG. 1, the imager 60 is located on a forward portion of the vehicle 12, for example the dashboard panel 20, on or near or below the vehicle A-pillar, and adjacent to the illuminator 40. (The intrusion detection system 10 also includes an illuminator 40a and imager 60a located on the passenger side of the vehicle 12 so as to provide intrusion detection for the vehicle right side structure 36.)

The intrusion detection system 10 also includes vehicle electric circuitry, such as a controller 70 and a memory 90. The controller 70 is connected with the illuminator 40 and the imager 60. The controller 70 is preferably a microcomputer programmed to compare sequential images taken by the imager 60, in a manner commonly known as "frame differencing". Numerous known frame differencing algorithms are usable in the present invention. Several are discussed below. Because the algorithms are simple, the differencing functions can be accomplished using hardware, and a separate microprocessor would not be needed. Therefore, almost the entire system 10, including the imager 60 and the controller 70 but excluding the illuminator 40, can be formed on one silicon chip shown schematically at 72 (FIG. 4).

Figure 5:
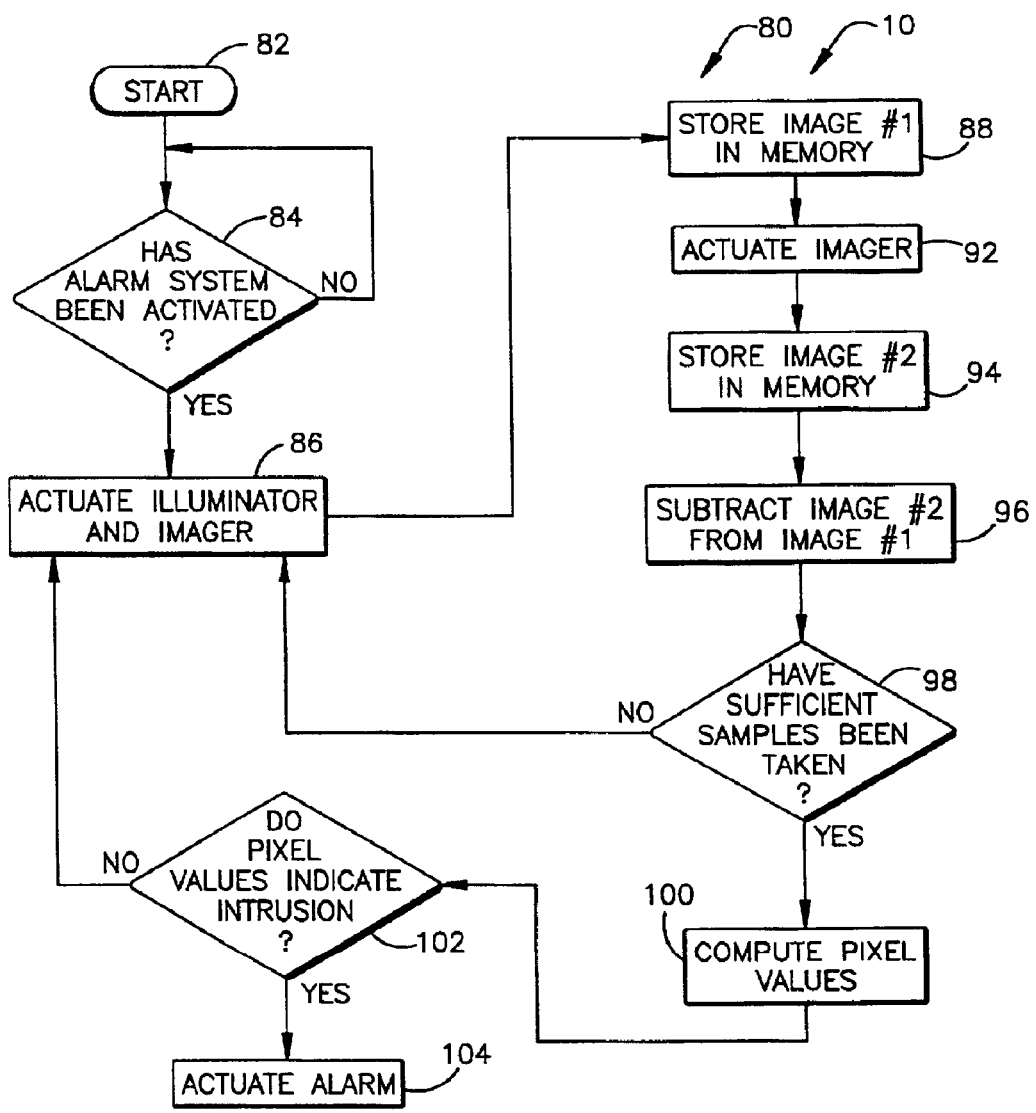
FIG. 5 is a flow chart illustrating a process used in the intrusion detection system of FIG. 1.

A process 80 for using the system 10 is illustrated in FIG. 5. The process 80 starts at step 82 where initial conditions for flags, memory, etc. are set within the controller 70. The process then proceeds to step 84. A determination is made at step 84 of whether the intrusion detection system 10 has been actuated. If the determination at step 84 is negative, the process loops back.

If the determination at step 84 is positive, the illuminator 40 and the imager 60 are both actuated at step 86. The illuminator 40 is actuated simultaneously with the imager 60, for a first period of illumination. The illuminator 40 produces the curtain of light 50 that impinges on any object in the field of illumination 52 of the illuminator. The first period of illumination has a predetermined duration, equal to the pulse duration of the illuminator 40, and preferably less than 10 milliseconds.

When the illuminator 40 is actuated, any object in the field of illumination 52 of the illuminator reflects light that emanates from the illuminator, as well as ambient light, back to the imager 60. The lens 65 of the imager 60 focuses the light on the focal plane 63. The light impinges on the pixels 61 of the imager 60. The imager 60 produces an output indicative of the light intensity at each pixel 61. Thus, the electronic output of the imager 60, i.e. the image, represents the light that is reflected onto the pixels 61 from objects in the field of illumination 52 of the illuminator 40, both ambient light and light reflected from the illuminator. This image (referred to hereinafter as image #1) is stored at step 88 in a memory 90 (FIG. 4) in a pixel-by-pixel format (a "pixilated" image). In this format, each pixel 61 output has a value that represents the intensity of light falling on that pixel.

The process 80 then proceeds to step 92, at which the imager 60 is again actuated. This imaging step 92 takes place a predetermined interval after the step 86 of actuating the illuminator 40 and imager 60 is terminated. Thus, there is a period of time between the succeeding actuations of the imager 60, in which the imager is not actuated. During this time period, power draw is minimized because the imager 60 is not actuated.

The imager is actuated at step 92 for a predetermined period of time, which is preferably the same as the preceding period of actuation at step 84. Because the illuminator 40 is not actuated during this second period of actuation of the imager 60, only ambient light impinges on the imager. The lens 65 of the imager 60 focuses the ambient light on the pixels 61 on the image plane 63.

As mentioned, the imager 60 produces an output indicative of the light intensity at each pixel 61. Thus, the electronic output of the imager 60 during step 92 represents only the ambient light that is reflected onto the pixels 61 from objects in the field of illumination of the illuminator. This image (referred to hereinafter as image #2) is stored at step 94 in memory 90 in a pixel-by-pixel format. In this format, each pixel 61 output has a value that represents the intensity of light falling on that pixel.

The process 80 then proceeds to step 96, at which image #2 is subtracted from image #1. This is done by using a known frame differencing process by the controller 70. The value of each pixel 61 in image #2 is subtracted from the value of the corresponding pixel 61 in image #1. The result is a set of pixel values, or a sample (a sample #1) that represents only the intensity of light that is both (a) generated by the illuminator 40 during the period of illumination of the illuminator, and (b) reflected from objects in the field of view 62 of the imager 60. The effects of ambient light are removed in step 96.

The process 80 proceeds to step 98 at which the number of samples that are stored in the memory 90 is counted. In a first embodiment of the invention, the above process is repeated to produce a second sample (a sample #2), and the second sample (sample #2) is compared with the first sample (sample #1) in a manner as described below. To accomplish this sample comparison, the number of samples stored in memory 90 must equal at least two to have a "sufficient" number of samples taken.

If the number of samples stored in memory 90 does not equal or exceed two, as is the case when the system 10 is first actuated, the determination in step 98 is negative and the process 80 returns to step 86 at which the illuminator 40 and the imager 60 are actuated simultaneously for a second period of illumination. An image (an image #3) is generated and stored in memory at step 88. Then, the process 80 proceeds to step 92 at which another image is taken, without the illuminator 40 being actuated. This image (an image #4) is generated and stored in memory 90 at step 94.

The process 80 then proceeds to step 96, at which image #4 is subtracted from image #3 to result in a sample #2 in the same manner that image #2 was subtracted from image #1 to result in a sample #1. The result is a second set of pixel values, or a second sample, that represents only the intensity of light that is both (a) generated by the illuminator 40 during this second period of illumination of the illuminator, and (b) reflected from objects in the field of view 62 of the imager 60. The effects of ambient light are again removed.

The second time through, the loop of steps 86–98 will result in an affirmative determination in step 98. From an affirmative determination in step 98, the process proceeds to step 100. The second sample is then compared with the first sample at step 100, in a manner as described below. That is, the reflectivity of objects that are located in the field of view 62 during the first period of illumination, is compared with the reflectivity of objects that are located in the field of illumination 52 during the second period of illumination. If this reflectivity changes by more than a predetermined amount at more than a predetermined number of pixels 61, then the system 10 infers that there is movement of an object into or out of the field of illumination 52, during the interval between successive periods of illumination, and an intrusion is presumed.

Specifically, at step 100, corresponding pixels 61 in each one of the first and second samples ($P_{j,i}$ and $P_{j,i-1}$) are subtracted, and the result compared with a constant, or threshold, alpha, to determine if the resultant subtraction is greater than alpha in accordance with the following relation (1):

$$\text{is } |P_{j,i} - P_{j,i-1}| > \alpha \qquad (1)$$

The value of the constant alpha is selected to be large enough to filter variation due to light noise. This process is repeated for each pixel location.

The controller 70 determines, at step 102, how many of the corresponding pixels in the first and second samples satisfy equation (1). An intrusion is inferred only if a predetermined number of pixels satisfy relation (1) in the comparison of the first sample with the second sample (i.e., after two successive samples).

The number of pixels 61 for which equation (1) must be satisfied is selected in accordance with the resolution of the imager 60 and the size of the object expected to be imaged. For example, if the imager 60 has sufficient pixels 61 so that the smallest significant object the system 10 would detect as an intrusion would image over 3 or more pixels, then equation (1) would need to be satisfied for a minimum of 3 pixels. As another example, if the number of pixels in the imager 60 is smaller, so that the smallest significant object the system 10 would detect as an intrusion would image over only 1 pixel, then equation (1) would only need to be satisfied for any one pixel.

If equation (1) is satisfied as described above for the required number of pixels 61, then a determination is made at step 102 that the pixel values indicate an intrusion and the determination in step 102 would be affirmative. From an affirmative determination in step 102, the alarm 103 (FIG. 4) is actuated at step 104. If relation (1) is not satisfied for the required number of pixels 61 at step 100, then the determination at step 102 is negative, meaning that the pixel values do not indicate an intrusion. From a negative determination in step 102, the process 80 loops back to step 86.

Those skilled in the art will appreciate that, during operation of the system 10, the steps 86–98 are performed on a continuous basis. The determination in step 98 would be negative only the first time through the loop. In a two sample arrangement, sample 1 is subtracted from sample 2 in step 100 and the determination in step 102 is made. The next time through the loop, sample 2 is subtracted from sample 3 in step 100. The next time through the loop, sample 3 is subtracted from sample 4, etc.

Also, if it is determined that system resolution requires an object size greater than a predetermined value to enter the field of view before an intrusion can be determined, then samples from a predetermined number of adjacent pixel locations must all experience changes greater than associated thresholds (which could be equal to each other).

The intrusion detection system 10 is advantageous in that it does not require the illumination of the entire occupant compartment 14 of the vehicle 12. Only a very small fraction of the vehicle occupant compartment 14 need be illuminated, for example, no more than about 5%, and feasibly no more than about 1%. In addition, the system 10 does not require the reading of pixels that view the entire occupant compartment 14 of the vehicle 12. Thus, less computational power is needed to make determinations based on the imaged pixel values. As a result of the low illumination and computation needs, current draw by the system 10 from the vehicle electrical system is minimized. This is the case even though the light curtains 50 and 50a cover all the possible entry points into the vehicle 12 through both the left and right side structures 21 and 34 of the vehicle.

In a second embodiment of the invention, a larger number of samples and sample comparisons are used to make the pixel values comparison at step 100. Therefore, when the process first reaches step 98, the process returns to step 86 at which the illuminator 40 and the imager 60 are again actuated simultaneously. The process repeats the loop of steps 86 through 98 until a predetermined number of samples are stored in memory 90, sufficient to make a positive intrusion determination.

In this second embodiment, the predetermined number of samples, needed to make an intrusion determination, is dependent on the required detection response time of the system 10 and on the sample rate of the system. The required detection response time is a minimum predetermined period of time, in excess of which the presence of an object in the field of view 62 of the imager 60 is considered to constitute an intrusion. For example, it may be decided that if an object moves into and remains present in the field of view 62 of the imager 60 for a time period of at least one tenth of a second, then an intrusion should be inferred. In this case, the intrusion detection response time would be set at one tenth of a second.

The sample rate of the system 10 must also be considered. For example, assume the system 10 takes samples (images) one hundred times a second. If the required detection response time is one tenth of a second (0.1 seconds), and the sample rate is one hundred samples per second, then at least ten samples are needed to determine if the intrusion lasted for this time duration. As another example, if the required detection response time is one tenth of a second (0.1 seconds), and the sample rate is twenty samples per second, then at least two samples are needed to determine if the intrusion lasted for this time duration.

The system 10 tracks the number of samples that have been taken since the beginning of the process at step 82. If this number of samples does not equal or exceed the predetermined number of samples needed, then an intrusion detection determination is premature, (i.e., the determination in step 98 is negative), and the process returns to step 86 to obtain an additional sample. On the other hand, if this number of samples equals or exceeds the predetermined number of samples needed, then the determination of an intrusion detection is not premature (i.e., the determination in step 98 would now be affirmative), and the process proceeds to step 100.

At steps 100 and 102 in accordance with the second embodiment, the intrusion determination is made, as follows. A running average value is computed for each pixel 61 of the imager 60 (thus, if the imager contains fifty pixels that are illuminated, a separate running average is computed for each one of the fifty pixels.) The running average value $A_{j,i}$ is computed according to relation (2) as follows:

$$A_{j,i} = \frac{n \cdot A_{j,i-1} + P_{j,i}}{n+1} \qquad (2)$$

where for each pixel "j", "$A_{j,i}$" is the running average value to be computed for that pixel; "n" is the number of times the pixel has been illuminated previously; "$A_{j,i-1}$" is the preceding (currently stored) running average value for that pixel; and "$P_{j,i}$" is the current output value of the pixel.

Thus, the formula multiplies the preceding running average value by the number of items in that running average value, adds the current single pixel value, and divides by the number of items in the previous running average value plus one. This formula provides a running average of all the measured or output values for that particular pixel 61.

In addition, a running standard deviation is computed for each pixel 61 (for example, if the imager 60 contains fifty pixels 61 that are illuminated, then a separate running standard deviation is computed for each one of the fifty pixels.) The running standard deviation is computed according to:

$$STDs_{j,i} = \frac{n \cdot STDs_{j,i-1} + (P_{j,i} - A_{j,i})^2}{n+1} \qquad (3)$$

This formula provides a standard deviation for all the output values of that particular pixel to the present. Using the standard deviation value formula that is shown in equation (3) rather than recomputing the entire set of values, which grows extremely large very quickly, minimizes the need for computing power and thus makes the calculation easier and less expensive to implement. In addition, the squaring operation involves substantially less computing power and is thus less costly to implement than a square root operation.

Numerous other methods are available for computing or estimating these average and standard deviation values. These particular examples are given because they are relatively computationally efficient, especially where the value of "n+1" is a power of 2, i.e., 2, 4, 8, 16, etc. With these particular formulas, the result is similar to a true average taken over 2*n values.

Regardless of the method used for computing the running average and the running standard deviation, the pixel values are compared according to:

$$(P_{j,i} - A_{j,i})^2 \geq m \cdot STDs_{j,i} \qquad (4)$$

where m is the number of allowable standard deviations that establish a threshold used to determine if an intrusion has occurred. The probability of a pixel's brightness changing beyond a few standard deviations is low (and this threshold is programmable by selecting m), so that if the light intensity value at many pixels all of a sudden deviate beyond the threshold probability would indicate that there must be an intrusion, because the light intensity value at each pixel is related to the presence of a reflective object in the field of view of the imager.

If the result of relation (4) is positive for a predetermined number of pixels, then the presence of an intrusion in the field of view 62 of the imager 60 is inferred; an intrusion determination is made at step 102; and the alarm 103 is actuated at step 104.

If the result of relation (4) is not positive for a predetermined number of pixels, the process loops back to step 86. The process 80 repeats steps 88–96 and another sample is added. The process 80 then recomputes the running average and the running standard deviation. These values are compared using equation (4). If the result of equation (4) is positive for a predetermined number of pixels, then the presence of an intrusion in the field of view 62 of the imager 60 is inferred; an intrusion determination is made at step 102; and the alarm 103 is actuated at step 104.

Figure 6:
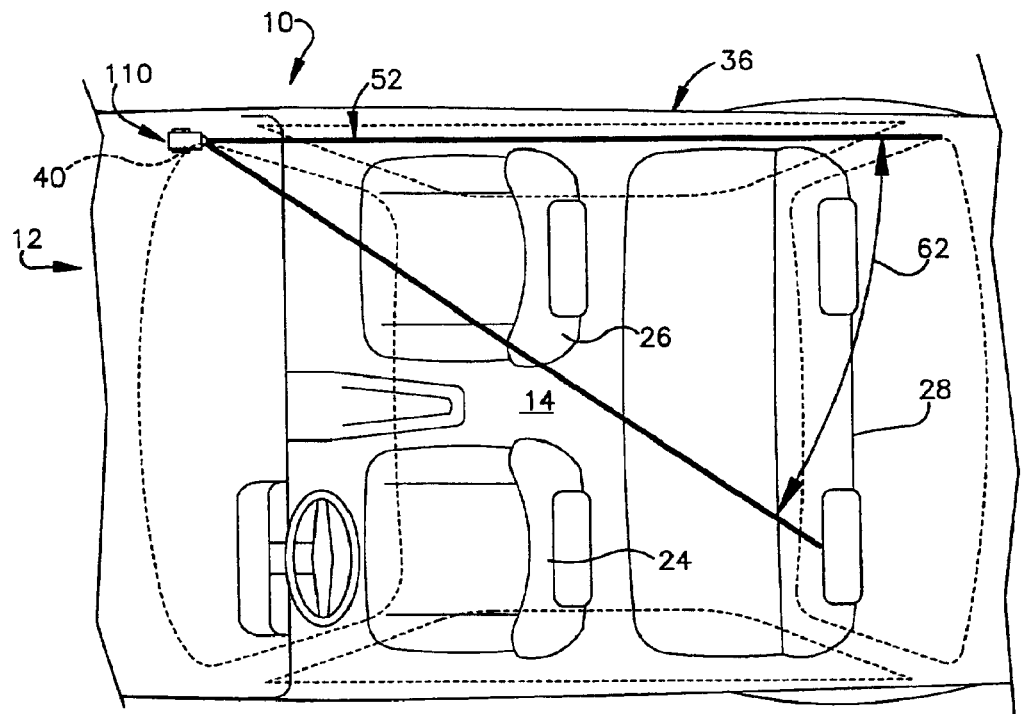
FIG. 6 is a view similar to FIG. 1 of a portion of a vehicle including an intrusion detection system in accordance with another embodiment of the invention.

In a third embodiment of the invention, shown in FIG. 6, the linear imager 60 is replaced by a two-dimensional (area) imager that images a larger portion of the vehicle occupant compartment 14. The area imager could be one that is already present in the vehicle 12, for example, for the purpose of driver recognition or occupant detection or position determination.

For example, in FIG. 6, the system 10 includes a two dimensional (area) imager 110 that is located adjacent the vehicle's front passenger seat 26. The imager 110 is used in a known manner to determine the presence, size, and/or position of an occupant of the seat 26. On the basis of that determination, a decision can be made as to whether to permit actuation of a passenger-side air bag inflator in the event of a vehicle collision and to tailor its deployment.

The field of view 62 of the imager 110 covers a relatively large portion of the vehicle occupant compartment 14, substantially more than the field of view of the linear imager 60 (FIGS. 1–4). However, the horizontal and vertical field of view 62 of the imager 110 (FIG. 6) includes the field of illumination 52 of the illuminator 40. Thus, the imager 110 can be used in conjunction with the same illuminator 40 as in the previous embodiments of the invention.

The illumination and imaging process is similar to that shown in FIG. 5. However, the images obtained by the imager 110 are two dimensional or area images, not linear images. Therefore, the images obtained by the imager 100 are processed electronically for intrusion detection only using that group of pixels in the imager 110 whose field of view overlaps, or substantially coincides with, the field of illumination 52 of the illuminator 40. The resulting set of pixels provides an output that is usable in the same manner as the output of the pixels 61 of the linear imager 60 (FIGS. 1–4).

In this embodiment, the particular regions of interest in intrusion detection are still illuminated, with the limited field of illumination 52 of the illuminator 40. Therefore, considerably less illumination power is needed than would be required to illuminate the entire field of view of the imager 110. A system with similar structure and operation could be provided for the driver's side of the vehicle.

In a fourth embodiment of the invention (FIG. 7), a second camera (imager) is added, and stereoscopic analysis is used to provide distance (ranging) information for objects in the field of illumination of the illuminator.

Figure 7:
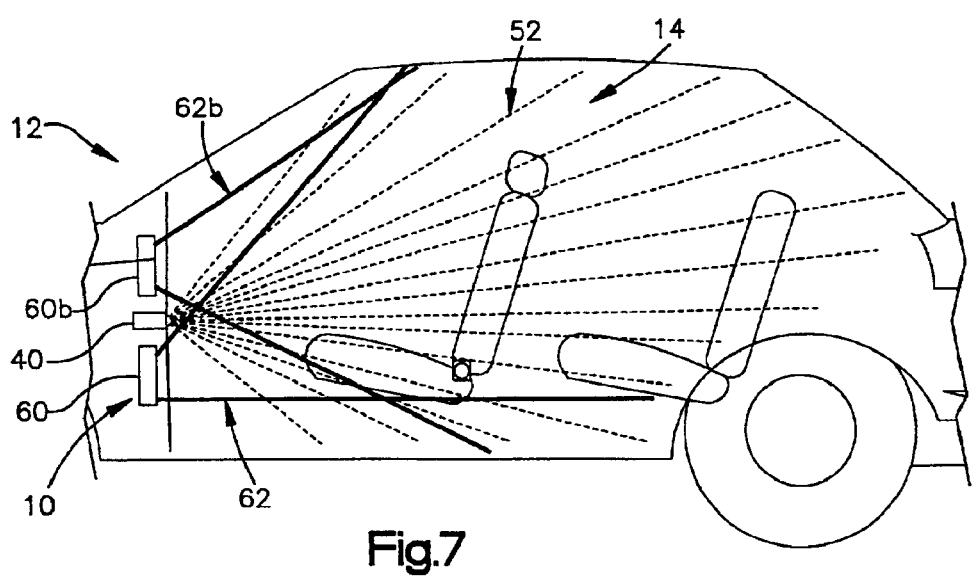
FIG. 7 is a view similar to FIG. 2 of a portion of a vehicle including an intrusion detection system in accordance with still another embodiment of the invention.
Figure 8:
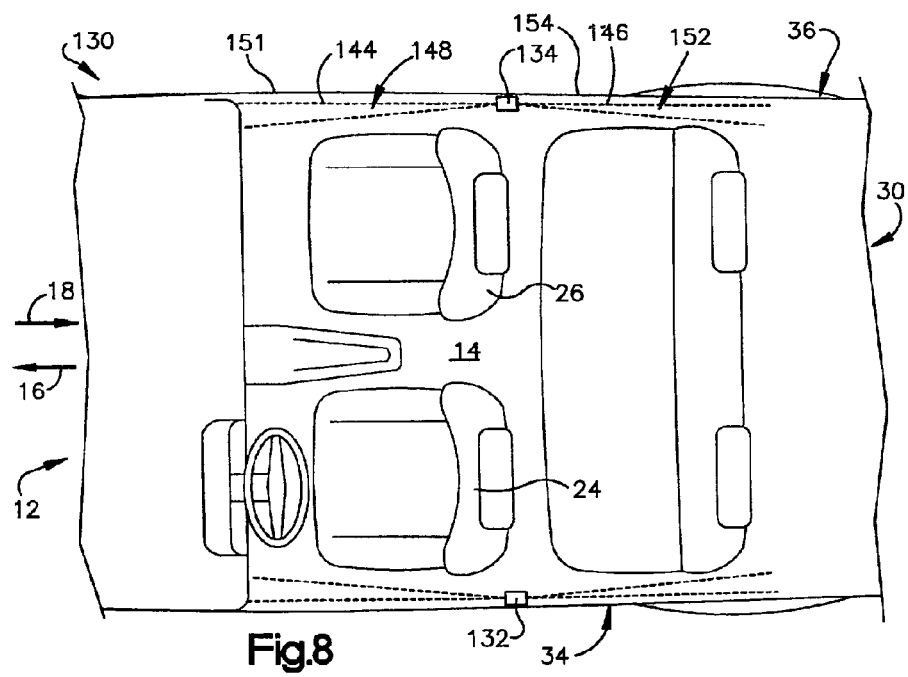
FIG. 8 is a view similar to FIG. 1 of a portion of a vehicle including an intrusion detection system in accordance with yet another embodiment of the invention.
Figure 9:
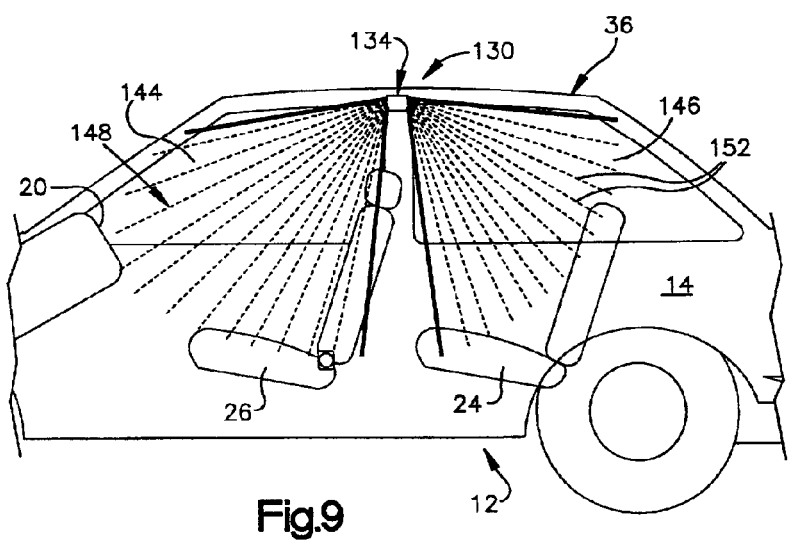
FIG. 9 is a schematic side view of a portion of the system of FIG. 8.
Figure 10:
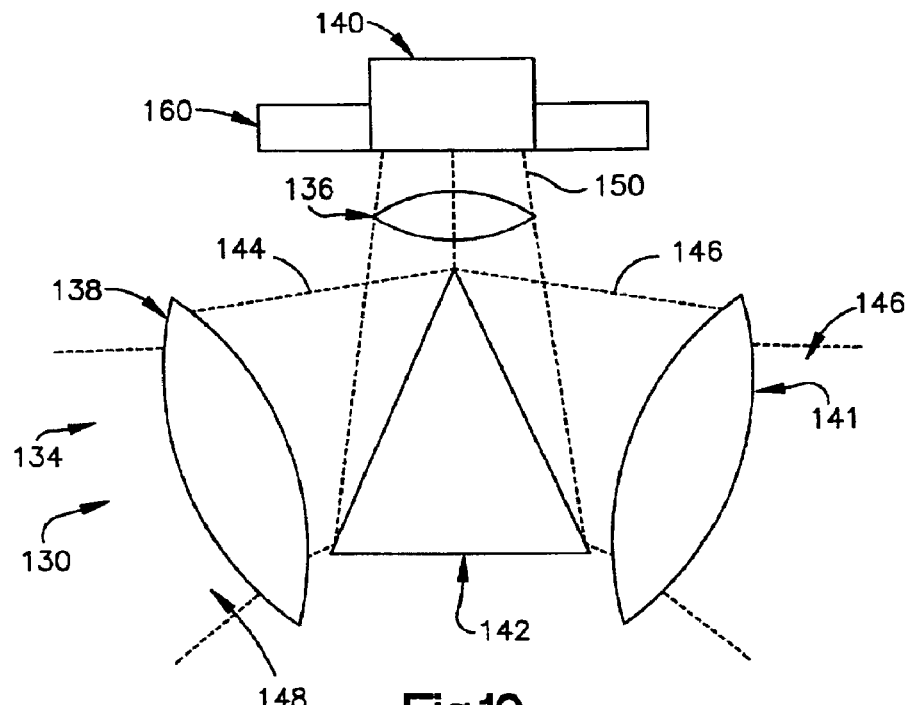
FIG. 10 is a schematic view of an illumination portion of the system of FIG. 8.

For example, in FIG. 7, the vehicle includes a second linear imager, or camera, 60b located above the first imager 60. The second imager 60b has a field of view 62b that includes most of the field of illumination 52 of the illuminator 40.

The second imager 60b is spaced apart from the first imager 60 by a distance (e.g., 2–4 inches, exaggerated in FIG. 7) that is selected to provide a variation in perspective (to an object in the field of illumination 52 of the illuminator 40) sufficient for stereoscopic analysis of the images provided by the imagers 60 and 60b.

Stereoscopic analysis is well known in the art and derives distance information from relative placement variations of common features within the field of view of two cameras that are separated laterally relative to the axis of view. Therefore, the algorithms needed for computing distance are not given herein.

Thus, the present invention contemplates the use of two linear imagers 60 and 60b as described to provide not only information as to the existence of an intrusion event, but also information as to the location of an object in the field of view of both images.

In a fifth embodiment of the invention (FIGS. 8–11), a single imager (camera) and illuminator are used, together with a multiple lens system, to cover two separate areas of a vehicle for intrusion detection. FIGS. 8–11 show portions of a vehicle 12 including an intrusion detection system 130. The system 130 includes a driver side intrusion module 132 and a passenger side intrusion module 134. The modules 132 and 134 are similar to each other, differing only as they are adapted to cover either the left side structure 34 or the right side structure 36 of the vehicle 12. Therefore, only the passenger side module 134 is described in detail herein.

The module 134 is mounted at the top of the B-pillar on the vehicle right side structure 36. The module 134 includes an illuminator 140 and a linear imager 160 similar to that as described above.

The module 134 also includes a plurality of illumination lenses 136, 138 and 141, and a beam splitter 142. The lens 136 receives the light beam 150 of the illuminator 140 and focuses the light beam onto the beam splitter 142, which may be a prism or mirror. The beam splitter 142 splits the light beam 150 into two beam portions 144 and 146. The beam portion 144 is produced simultaneously with the beam portion 146.

The first beam portion 144 is directed to the illumination lens 138. The lens 138 directs this beam portion 144 forward in the vehicle to provide a field of illumination 148 (FIG. 9) that extends along, or adjacent, the inside of the vehicle outer side structure 36. In the illustrated embodiment, the field of illumination 148 extends along, or adjacent, the inside of the front window 151 of the right side structure 36 of the vehicle 12. The beam portion 144 has a lateral spread of no more than five degrees, so that it effectively creates a curtain of light extending along but not touching (adjacent) the inside of the front window 151 of the right side structure 36 of the vehicle 12. The beam portion 144 produced by the illuminator 140 thus has a limited field of illumination 148, as in the first embodiment described above. The location and configuration of the beam portion 144 are selected to detect any intrusion into the vehicle 12 through the front window 151 of the right side structure 36 of the vehicle.

The second beam portion 146 is directed to the illumination lens 141. The lens 141 directs this second beam portion 146 rearward in the vehicle to provide a field of illumination 152 (FIG. 9) that extends along, or adjacent, the inside of the vehicle outer side structure 36. In the illustrated embodiment, the field of illumination 152 extends along, or adjacent, the inside of the back window 154 of the right side structure 36 of the vehicle 12. The beam portion 146 has a lateral spread of no more than five degrees so that it effectively creates a curtain of light extending along but not touching the inside of (adjacent) the back window 154 of the right side structure 36 of the vehicle 12. The beam portion 146 produced by the illuminator 140 thus has a limited field of illumination 152, as in the first embodiment described above. The location and configuration of the beam portion 146 are selected to detect any intrusion into the vehicle 12 through the back window 154 of the right side structure 36 of the vehicle.

Figure 11:
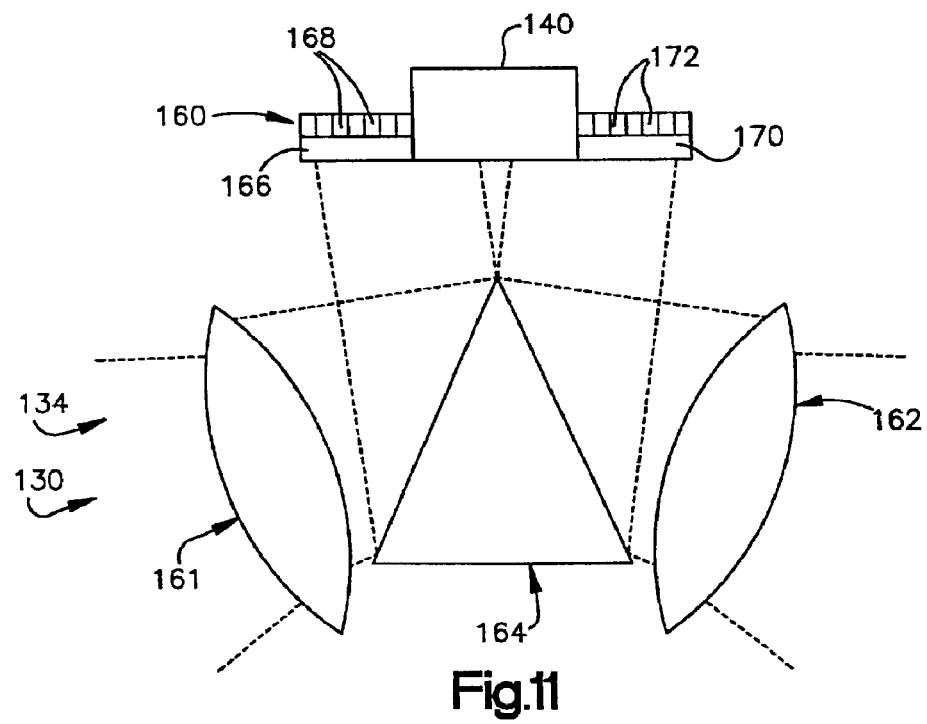
FIG. 11 is a schematic view of an imaging portion of the system of FIG. 8.

The module 134 also includes a plurality of imager lenses 161 and 162 (FIG. 11). The lens 161 receives light reflected from objects in its field of view. This light is directed onto a prism or mirror 164. The prism or mirror 164 directs the light from the lens 160 onto a first portion 166 of the linear imager 160. The first portion 166 of the imager 160 contains a line of pixels 168. The line of pixels 168 image light that is reflected from objects in the field of view.

The other imager lens 162 receives light reflected from objects in its field of view. This light is directed onto the prism or mirror 164. The prism or mirror 164 directs the light beam from the second imager lens 162 onto a second portion 170 of the linear imager 160. The second portion 170 of the imager 160 is electronically distinct from the first portion 166, that is, it includes a line of pixels 172 that does not include any of the pixels 168 of the first portion 166 of the imager 160. The pixels 172 image light that is reflected from objects in its field of view.

The output of the imager 60 is directed to a controller 70. As in the system 10, the controller 70 could be implemented using discrete hardware. The control process may be the same as or similar to one of those described above. The control process uses frame differencing to remove background illumination (ambient light) variations and compares samples to determine the movement into or presence of objects in the monitors' field of view. The output of the first imager portion 166 is processed separately from the output of the second imager portion 170. If an intrusion determination is made, the vehicle alarm is actuated.

From the above description of the invention, those skilled in the art will perceive improvements, changes and modifications in the invention. Such improvements, changes and modifications within the skill of the art are intended to be covered by the appended claims.

Having described the invention, we claim:

1. A method of detecting an intrusion condition of a vehicle having an occupant compartment partially defined by an outer structure of the vehicle, said method comprising the steps of:

actuating an illuminator having a limited field of illumination extending within the vehicle occupant compartment adjacent the vehicle outer structure;

actuating an imager that has a field of view that substantially coincides with the field of illumination of the illuminator;

creating a first image of objects in the field of illumination when the illuminator is actuated;

creating a second image of objects in the field of illumination when the illuminator is not actuated;

subtracting the first image from the second image to establish a sample image;

determining the existence of an intrusion condition of the vehicle on the basis of a comparison of at least two sample images.

2. A method as set forth in claim 1 wherein said step of actuating an illuminator includes the step of actuating an illuminator having a field of illumination that diverges outward from the illuminator by no more than about five degrees as it extends within the vehicle occupant compartment.

3. A method as set forth in claim 1 wherein said step of actuating an illuminator includes the step of actuating an illuminator having a field of illumination that diverges outward from the illuminator by no more than two degrees as it extends within the vehicle occupant compartment.

4. A method as set forth in claim 1 wherein said step of actuating an illuminator includes the step of actuating an illuminator having a field of illumination that has a width of no more than one to three inches as it extends within the vehicle occupant compartment.

5. A method as set forth in claim 1 wherein said step of actuating an imager includes the step of actuating a linear imager having a field of view that substantially coincides with the field of illumination of the illuminator.

6. A method as set forth in claim 1 wherein said step of determining the existence of an intrusion includes the steps of:

determining the difference between two consecutive sample images, and comparing the difference with a threshold.

7. A method as set forth in claim 1 wherein each one of said steps of creating a first image and creating a second image includes the step of creating a pixilated image on the imager, and said step of determining the existence of an intrusion condition includes the step of making a pixel by pixel comparison of the at least two sample images.

8. A method as set forth in claim 7 wherein said steps are repeated at least ten times per second, and wherein said step of making a pixel by pixel comparison includes the step of determining a running average of the value of each pixel.

9. A method as set forth in claim 1 wherein said step of creating a second image is performed within a time period of from about 5 milliseconds to about 100 milliseconds after said step of creating a first image.

10. A method as set forth in claim 1 wherein said step of actuating an illuminator includes the step of illuminating a field of illumination that does not include any side windows of the vehicle.

11. A method as set forth in claim 1 wherein:

said step of creating a first image includes the step of creating a first pixilated image;

said step of creating a second image includes the step of creating a second pixilated image; and said step of determining the existence of an intrusion condition includes the steps of:

creating a large number of pairs of first and second images over an extended period of time;

for each pixel in each image pair, determining a value for the difference between the value of the pixel in the first image and in the second image;

for each pixel, calculating a running average of the difference value for all the image pairs;

for each pixel, calculating a running standard deviation of the difference value for all the image pairs;

for each pixel, comparing the running average with the running standard deviation; and determining the existence of an intrusion condition of the vehicle on the basis of said step of comparing the running average with the running standard deviation.

12. A method as set forth in claim 11 wherein said step of determining the existence of an intrusion condition of the vehicle further includes the steps of:

determining whether the number of image pairs exceeds a predetermined number of image pairs, and determining whether the outcome of said step of comparing the running average with the running standard deviation exceeds a predetermined value for a sufficient number of pixels.

13. A method as set forth in claim 1 wherein:

said step of actuating an imager includes the step of actuating a pixilated area imager, and said steps of creating first and second images include the steps of creating images using only those pixels of the pixilated imager that coincide with the field of illumination of the illuminator.

14. A method as set forth in claim 1 further comprising the steps of:

actuating a second imager that has a field of view overlapping the field of view of the first imager and that is spaced apart from the first imager by a first distance, and making a distance determination to objects in the field of illumination by stereoscopic analysis of the first and second images.

15. A method as set forth in claim 1 wherein said step of actuating an illuminator includes the step of using a single illuminator to illuminate two separate areas extending within the vehicle compartment along the vehicle outer structure;

said step of creating a first image includes the step of using a single imager to create separate first images of the two separate areas; and said step of creating a second image includes the step of using the single imager to create separate second images of the two separate areas.

16. A method of detecting an intrusion condition of a vehicle having an occupant compartment, said method comprising the steps of:

illuminating a predetermined field of illumination in the vehicle interior that is less than 5% of the vehicle occupant compartment, for a first predetermined period of time of less than ten milliseconds;

creating a first image of objects in the field of illumination when the illuminator is actuated during the first period of time;

when the illuminator is not actuated, creating a second image of objects in the field of illumination during a second predetermined period of time of less than ten milliseconds;

subtracting the first image from the second image to establish a sample image; and determining the existence of an intrusion condition of the vehicle on the basis of a comparison of at least two sample images.

17. A method as set forth in claim 16 wherein said illuminating step includes the step of illuminating less than 2% of the vehicle occupant compartment, for a first predetermined period of time of less than one millisecond.

18. A method as set forth in claim 17 wherein said illuminating step includes the step of actuating an illuminator having a field of illumination that diverges outward from the illuminator by no more than five degrees as it extends within the vehicle occupant compartment adjacent the vehicle outer structure to provide a field of illumination that has a width of no more than one to three inches as it extends within the vehicle occupant compartment adjacent the vehicle outer structure, and wherein each one of said steps of creating first and second images includes the step of actuating a linear imager having a field of view that substantially coincides with the field of illumination of the illuminator.

19. A vehicle intrusion detection system for detecting an intrusion condition of a vehicle having an occupant compartment partially defined by an outer structure of the vehicle, said system comprising:

an actuatable illuminator mounted in the vehicle and having a limited field of illumination extending within the vehicle occupant compartment adjacent the vehicle outer structure;

a linear imager mounted in the vehicle and having a field of view that substantially coincides with the field of illumination of said illuminator; and means for comparing a first image taken by said imager when said illuminator is actuated and a second image taken by said imager when said illuminator is unactuated to help determine the existence of an intrusion condition of the vehicle.

20. A system as set forth in claim 19 wherein said illuminator has a field of illumination that diverges outward from the illuminator by no more than one to five degrees to produce a field of illumination that has a width of no more than one to three inches as it extends within the vehicle occupant compartment adjacent the vehicle outer structure.

21. A system as set forth in claim 19 wherein said imager and said means for comparing are on a single chip.

22. A system as set forth in claim 19 wherein said means for comparing the first image with the second image includes means for determining the difference between the first image and the second image to establish a sample image, and means for determining the existence of an intrusion condition on the basis of comparison of at least two sample images.

23. A system as set forth in claim 19 wherein said linear imager takes pixilated images and said means for comparing comprises means for comparing a large number of pairs of first and second pixilated images over an extended period of time, means for determining a value for the difference between the value of the pixel in the first image and in the second image for each pixel pair, means for calculating a running average of the difference value for all the image pairs for exam pixel, means for calculating a running standard deviation of the difference value for all the image pairs for each pixel, means for comparing the running average with the running standard deviation for each pixel, and means for determining the existence of an intrusion condition of the vehicle on the basis of the comparison of the running average with the running standard deviation.

24. A system method as set forth in claim 19 wherein illuminator is a single illuminator that is operative to illuminate two separate areas extending within the vehicle compartment adjacent the vehicle outer structure, and said imager is a single imager that is operative to create separate first images of the two separate areas and to create separate second images of the two separate areas.

* * * * *